US012731817B2

(12) United States Patent
Zhang et al.

(10) Patent No.: US 12,731,817 B2
(45) Date of Patent: Sep. 8, 2026

(54) ELECTROCHEMICAL APPARATUS AND ELECTRONIC APPARATUS

(71) Applicant: Ningde Amperex Technology Limited, Ningde (CN)

(72) Inventors: Shuirong Zhang, Ningde (CN); Lilan Zhang, Ningde (CN); Xiao Yuan, Ningde (CN); Chao Tang, Ningde (CN)

(73) Assignee: Ningde Amperex Technology Limited, Ningde City (CN)

( * ) Notice: Subject to any disclaimer, the term of this patent is extended or adjusted under 35 U.S.C. 154(b) by 537 days.

(21) Appl. No.: 18/331,320

(22) Filed: Jun. 8, 2023

(65) Prior Publication Data

US 2023/0318038 A1 Oct. 5, 2023

Related U.S. Application Data

(63) Continuation of application No. PCT/CN2021/104025, filed on Jul. 1, 2021.

(30) Foreign Application Priority Data

Dec. 9, 2020 (CN) ........................ 202011448018.X

(51) Int. Cl.
*H01M 10/0567* (2010.01)
*H01M 4/02* (2006.01)
*H01M 4/134* (2010.01)
*H01M 10/0569* (2010.01)

(52) U.S. Cl.
CPC ....... *H01M 10/0567* (2013.01); *H01M 4/134* (2013.01); *H01M 10/0569* (2013.01); *H01M 2004/021* (2013.01); *H01M 2004/027* (2013.01); *H01M 2300/0034* (2013.01)

(58) Field of Classification Search
CPC ................................................ H01M 10/0567
See application file for complete search history.

(56) References Cited

U.S. PATENT DOCUMENTS

2014/0356724 A1 12/2014 Iwami
2014/0370361 A1 12/2014 Cheong et al.
2016/0013517 A1* 1/2016 Nakazawa ........ H01M 10/0525 429/188
2016/0233544 A1 8/2016 Kim et al.
2019/0115586 A1 4/2019 Kamo et al.
2020/0203731 A1* 6/2020 Yamashita .............. H01M 4/62
2020/0269207 A1 8/2020 Zafiropoulos et al.
2021/0408595 A1 12/2021 Tang et al.
2022/0029149 A1* 1/2022 Croy ................. H01M 10/0525
2023/0044589 A1* 2/2023 Ogita .................... H01M 4/667

FOREIGN PATENT DOCUMENTS

CN 102496737 A 6/2012
CN 104269576 A 1/2015
CN 105261790 A 1/2016
CN 105375066 A 3/2016
CN 105514489 A 4/2016
CN 106058317 A 10/2016
CN 107749464 A 3/2018
CN 109309226 A 2/2019
CN 110867613 A 3/2020
CN 110890591 A 3/2020
CN 111082129 A 4/2020
CN 109599595 B 5/2020
CN 112005418 A 11/2020
CN 112582676 A 3/2021
CN 107949949 A 1/2022

OTHER PUBLICATIONS

Office Action issued on Oct. 11, 2021, in corresponding Chinese Application No. 202011448018.X, 16 pages.
International Search Report and Written Opinion issued on Aug. 26, 2021, in corresponding International Application No. PCT/CN2021/104025, 15 pages.
Extended Search Report issued on Feb. 19, 2025, in corresponding European Application No. 21902006.2, 13 pages.
Office Action issued on Jul. 15, 2026, in corresponding Chinese Application No. 202310864638.9, 12 pages.

* cited by examiner

*Primary Examiner* — Brian R Ohara
(74) *Attorney, Agent, or Firm* — Maier & Maier, PLLC

(57) ABSTRACT

An electrochemical apparatus, including a positive electrode, a negative electrode, and an electrolyte, where the electrolyte includes fluoroethylene carbonate and non-fluorinated cyclic carbonate, the fluoroethylene carbonate accounts for a % of the electrolyte by mass, and the non-fluorinated cyclic carbonate accounts for b % of the electrolyte by mass, where $0.05 \leq a/b \leq 2.5$.

18 Claims, No Drawings

ELECTROCHEMICAL APPARATUS AND ELECTRONIC APPARATUS

CROSS REFERENCE TO RELATED APPLICATIONS

This application is a continuation application of International Application No. PCT/CN2021/104025, filed on Jul. 1, 2021, which claims the benefit of priority of Chinese patent application 202011448018.X, filed on Dec. 9, 2020, the contents of which are incorporated herein by reference in its entirety.

TECHNICAL FIELD

This application relates to the field of electrochemical technologies, and in particular, to an electrochemical apparatus and an electronic apparatus.

BACKGROUND

Electrochemical apparatuses (for example, lithium-ion batteries) have been widely used in electronic products such as mobile phones and notebook computers in recent years. With the increasing market needs for lighter and thinner electronic products, requirements for energy density of the electrochemical apparatuses are becoming increasingly high.

To improve energy density of the electrochemical apparatus, a silicon material has received increasing attention, and when used as a negative electrode material, the silicon material has a far higher theoretical capacity than an existing carbon material. However, a volume of the silicon material greatly changes during a lithium intercalation and deintercalation process, which is likely to cause an SEI film at a negative electrode interface to split. Especially, in cycling, lithium intercalation and deintercalation is continuously performed on the silicon material, which causes the SEI film to consecutively split and a new interface to be exposed.

The new interface reacts with the electrolyte, to consume the electrolyte and active lithium, thereby causing cycling degradation. In addition, the silicon material has poor conductivity, and direct current resistance of the electrochemical apparatus is increased when the silicon material is used. Therefore, how conductivity of the electrochemical apparatus in a silicon material system is improved needs to be resolved.

SUMMARY

This application provides an electrochemical apparatus, including a positive electrode, a negative electrode, and an electrolyte, where the electrolyte includes fluoroethylene carbonate and non-fluorinated cyclic carbonate, the fluoroethylene carbonate accounts for a % of the electrolyte by mass, and the non-fluorinated cyclic carbonate accounts for b % of the electrolyte by mass, where $0.05 \leq a/b \leq 2.5$. In some embodiments, the ratio of the fluoroethylene carbonate to the non-fluorinated cyclic carbonate being limited can ensure that the fluoroethylene carbonate is not so much more than the non-fluorinated cyclic carbonate as to cause the direct current resistance of the electrochemical apparatus to increase, and ensure that the fluoroethylene carbonate is not so much less than the non-fluorinated cyclic carbonate as to cause the cycling performance of the electrochemical apparatus to reduce. Therefore, the electrochemical apparatus has both good cycling performance and low direct current resistance.

In some embodiments, $3 \leq a \leq 25$. In some embodiments, $11 \leq b \leq 34$. In some embodiments, $0.09 \leq a/b \leq 2.27$. In some embodiments, volume swelling of a negative electrode material may occur due to lithium intercalation and deintercalation in cycling, causing an SEI film of the negative electrode material to split. The fluoroethylene carbonate can continuously repair the SEI film of the negative electrode material in cycling of the electrochemical apparatus, thereby improving the cycling performance of the electrochemical apparatus. However, the viscosity of the fluoroethylene carbonate is relatively great, and if an excessively large amount of fluoroethylene carbonate is added, conductivity of the electrolyte may be decreased. Therefore, the amount of the fluoroethylene carbonate being limited improves the cycling performance while preventing the conductivity from decreasing.

In some embodiments, the negative electrode includes a negative electrode current collector and a negative electrode active material layer disposed on the negative electrode current collector, the negative electrode active material layer includes a negative electrode material, the negative electrode material includes a silicon-containing material, and mass of silicon element per unit coating area on the negative electrode current collector is X mg/cm$^2$, wherein $0.1 \leq X \leq 1.3$. In some embodiments, $0.2 \leq X \leq 1.3$. The negative electrode material of the electrochemical apparatus includes a silicon-containing material, which can increase the specific capacity of the negative electrode material of the electrochemical apparatus. Because volume swelling of the silicon material is obvious in cycling, the mass of element silicon per unit coating area on the negative electrode current collector is limited so as to limit cycling-induced swelling of the negative electrode material.

In some embodiments, $a/b=Z$ and $0.76 \leq Z/X \leq 2.5$. Silicon, the fluoroethylene carbonate, and the non-fluorinated cyclic carbonate matching proportionally can prevent the cycling performance from decreasing and the direct current resistance from increasing while improving the stability of the SEI film.

In some embodiments, the electrolyte further includes a non-fluorinated linear ester, and the non-fluorinated linear ester accounts for c % of the electrolyte by mass, where $0.1 \leq b/c \leq 1$, and in some embodiments, $0.25 \leq b/c \leq 0.81$, and the non-fluorinated cyclic carbonate includes at least one of ethylene carbonate or propylene carbonate. The viscosity of the non-fluorinated linear ester is low, and therefore adding the non-fluorinated linear ester into the electrolyte helps to reduce the overall viscosity of the electrolyte. However, the relative dielectric constant of the non-fluorinated linear ester is low, and therefore adding too much non-fluorinated linear ester reduces the overall relative dielectric constant of the electrolyte. Limiting b/c guarantees a sufficiently high dielectric constant of the electrolyte while reducing the viscosity of the electrolyte.

In some embodiments, the negative electrode further includes a conductive layer disposed between the negative electrode current collector and the negative electrode active material layer; and a thickness d of the conductive layer satisfies $0.3\ \mu m \leq d \leq 1.5\ \mu m$. The volume swelling of the silicon-containing material is great during charging and discharging, and such swelling may cause the negative electrode active material layer to fall off the negative electrode current collector. Therefore, the conductive layer is provided between the negative electrode active material layer and the negative electrode current collector. When the mass ratio of the fluoroethylene carbonate to the non-fluorinated cyclic carbonate in the electrolyte meets a proper condition so as to match the thickness d of the conductive layer, deformation caused by swelling of the negative electrode active material layer can be alleviated, preventing the negative electrode active material layer from falling off the negative electrode current collector. When d is less than 0.3 μm, it is likely that the conductive layer is so thin that an effect of alleviating swelling-induced deformation is poor. When d is greater than 1.5 μm, it is likely that the volumetric energy density of the electrochemical apparatus decreases.

In some embodiments, the silicon-containing material includes at least one of $SiO_x$, a silicon-carbon compound, or elemental silicon, where $0.5 \leq x \leq 1.5$; a surface of the silicon-containing material has a protective layer, and the protective layer includes a metal element; and the metal element includes at least one of Al, Si, Ti, Mn, V, Cr, Co, or Zr. The protective layer can suppress the volume swelling of the silicon-containing material, and its metal element contained can increase the conductivity of the protective layer.

In some embodiments, a mass ratio of the metal element to the negative electrode active material layer is r1, where 0.5 ppm≤r1≤15000 ppm. In some embodiments, 180 ppm≤r1≤4520 ppm. In this case, the cycling performance of the electrochemical apparatus is good and the direct current resistance thereof is low.

In some embodiments, a mass ratio of the silicon-containing material to the negative electrode active material layer is r2, where 0.5%≤r2≤85%. When r2 is less than 0.5%, an effect of improving a specific capacity by the silicon-containing material is not obvious. When r2 is greater than 85%, the silicon-containing material is too much, and consequently, volume swelling of the negative electrode active material layer during charging and discharging is excessively great. This may cause that the electrochemical apparatus has poor stability and increased direct current resistance.

In some embodiments, the negative electrode active material layer has a porosity of 20% to 30%. When the porosity is less than 20%, less contact between the electrolyte and the negative electrode material may occur, resulting in insufficient infiltration of the electrolyte into the negative electrode material, and when the silicon-containing material swells, internal stress of the negative electrode active material layer is increased due to the excessively low porosity. However, when the porosity is greater than 30%, overall conductivity of the negative electrode active material layer may be decreased due to excessively large gaps between particles of the negative electrode material, thereby causing an increase in direct current resistance.

This application further provides an electronic apparatus, including the electrochemical apparatus according to any one of the foregoing aspects.

The electrochemical apparatus provided in the embodiments of this application includes the positive electrode, the negative electrode, and the electrolyte, where the electrolyte includes the fluoroethylene carbonate and the non-fluorinated cyclic carbonate, the fluoroethylene carbonate accounts for a % of the electrolyte by mass, and the non-fluorinated cyclic carbonate accounts for b % of the electrolyte by mass, where 0.05≤a/b≤2.5. The electrochemical apparatus (especially the electrochemical apparatus containing the silicon material) provided in the embodiments of this application has improved cycling performance and reduced direct current resistance.

DETAILED DESCRIPTION

The following describes the embodiments of this application in detail. Although some embodiments of this application are shown, it should be understood that this application can be implemented in various forms and are not to be construed as being limited to the embodiments illustrated herein. On the contrary, these embodiments are provided to help more thoroughly and completely understand this application. It should be understood that the embodiments of this application are only used as examples, and are not intended to limit the protection scope of this application.

To resolve at least a portion of the foregoing problem, some embodiments of this application provide an electrochemical apparatus, including a positive electrode, a negative electrode, and an electrolyte, where the electrolyte includes fluoroethylene carbonate and non-fluorinated cyclic carbonate, the fluoroethylene carbonate accounts for a % of the electrolyte by mass, and the non-fluorinated cyclic carbonate accounts for b % of the electrolyte by mass, where 0.05≤a/b≤2.5. In some embodiments, the non-fluorinated cyclic carbonate includes at least one of ethylene carbonate or propylene carbonate. In some embodiments of this application, fluoroethylene carbonate can repair a SEI film of a negative electrode material to improve cycling performance of the electrochemical apparatus, but has relatively great viscosity. When a large amount of fluoroethylene carbonate is added, conductivity of the electrolyte is reduced. Non-fluorinated cyclic carbonate has good conductivity, considering a high dielectric constant of fluoroethylene carbonate, non-fluorinated cyclic carbonate can be reduced, and consequently, a percentage of contained fluoroethylene carbonate and a percentage of contained non-fluorinated cyclic carbonate need to be balanced. Therefore, to protect the SEI film of the negative electrode material while preventing conductivity of the electrolyte from decreasing, a ratio of the fluoroethylene carbonate to the non-fluorinated cyclic carbonate needs to be limited, to ensure that a percentage of fluoroethylene carbonate is not excessively greater than a percentage of non-fluorinated cyclic carbonate, which otherwise causes the direct current resistance of the electrochemical apparatus to increase, and to ensure that a percentage of fluoroethylene carbonate is not excessively less than a percentage of non-fluorinated cyclic carbonate, which otherwise causes the cycling performance of the electrochemical apparatus to decrease. In some embodiments, when 0.05≤a/b≤2.5, the electrochemical apparatus has both good cycling performance and low direct current resistance.

In some embodiments of this application, 3≤a≤25, and preferably, 10.5≤a≤25, 11≤b≤34, and 0.09≤a/b≤2.27. In some embodiments of this application, the negative electrode material, especially the negative electrode material containing the silicon material, may experience volume swelling due to lithium intercalation and deintercalation in cycling, causing the SEI film of the negative electrode material to split, and the fluoroethylene carbonate can continuously repair the SEI film of the negative electrode material in cycling of the electrochemical apparatus, to improve the cycling performance of the electrochemical apparatus. Therefore, in some embodiments, a specific amount of fluoroethylene carbonate is added into the electrolyte. However, the viscosity of the fluoroethylene carbonate is relatively great, and if an excessively large amount of fluoroethylene carbonate is added, conductivity of the electrolyte may be decreased. Therefore, in some embodiments of this application, it is defined that $10.5 \le a \le 25$.

In some embodiments of this application, the negative electrode includes a negative electrode current collector and a negative electrode active material layer disposed on the negative electrode current collector, the negative electrode active material layer includes a negative electrode material, the negative electrode material includes a silicon-containing material, and mass of silicon element per unit coating area on the negative electrode current collector is X mg/cm$^2$, where $0.1 \le X \le 1.3$, and preferably $0.2 \le X \le 1.3$. In this application, the negative electrode active material layer can be disposed on one face or both faces of the negative electrode current collector. If the negative electrode active material layer is disposed on the both faces of the negative electrode current collector, mass of silicon element per unit coating area on the negative electrode current collector is mass of silicon element per unit coating area on one surface of the negative electrode current collector. In this embodiment of this application, the negative electrode material of the electrochemical apparatus includes the silicon-containing material, and therefore, a specific capacity of the negative electrode material of the electrochemical apparatus can be increased; and because volume swelling of the silicon material in cycling is relatively obvious, it is defined that mass X mg/cm$^2$ of silicon element per unit coating area on the negative electrode current collector satisfies $0.1 \le X \le 1.3$, to limit a percentage of contained silicon-containing material, thereby limiting swelling of the negative electrode material due to cycling.

In some embodiments of this application, $a/b=Z$, and $0.76 \le Z/X \le 2.5$. In some embodiments, a splitting degree of the SEI film caused by the swelling of the negative electrode material is related to the percentage of silicon-containing material, that is, the greater X is, the greater the percentage of fluoroethylene carbonate is needed to repair the SEI film, and therefore, $0.9 \le Z/X$, thereby ensuring that there is sufficient fluoroethylene carbonate to repair the SEI film of the negative electrode material, and it is also defined that $Z/X \le 2.5$, thereby preventing an excessively great percentage of fluoroethylene carbonate from causing a decrease in the cycling performance of the electrochemical apparatus and an increase in the direct current resistance.

In some embodiments of this application, the electrolyte further includes a non-fluorinated linear ester, and the non-fluorinated linear ester accounts for c % of the electrolyte by mass, where $0.1 \le b/c \le 1$, and preferably $0.25 \le b/c \le 0.81$. Non-fluorinated linear ester has lower viscosity. Adding the non-fluorinated linear ester into the electrolyte helps reduce overall viscosity of the electrolyte. However, non-fluorinated linear ester has a low relative dielectric constant. When an excessively great amount of non-fluorinated linear ester is added, an overall relative dielectric constant of the electrolyte is decreased. To ensure dissolution of a lithium salt and transmission of ions in the electrolyte, the electrolyte needs to have sufficiently great polarity, and only an electrolyte with a sufficiently high relative dielectric constant can help reduce strong electrostatic attraction of ions between positive and negative electrodes, so that the ions can be dissociated into free ions. Therefore, in this application, $0.1 \le b/c \le 1$, and preferably $0.25 \le b/c \le 0.81$, thereby ensuring that the electrolyte has a sufficiently high dielectric constant while reducing the viscosity of the electrolyte.

In some embodiments of this application, the non-fluorinated linear ester includes at least one of dimethyl carbonate (DMC), diethyl carbonate (DEC), ethyl methyl carbonate (EMC), ethyl propyl carbonate, methyl formate, methyl acetate, ethyl acetate, propyl acetate, isopropyl acetate, butyl acetate, sec-butyl acetate, isobutyl acetate, tertiary acetate butyl ester, methyl propionate, propyl propionate, isopropyl propionate, methyl butyrate, ethyl butyrate, propyl butyrate, methyl isobutyrate, ethyl isobutyrate, methyl valerate, or ethyl valerate.

In some embodiments of this application, the negative electrode further includes a conductive layer disposed between the negative electrode current collector and the negative electrode active material layer; and a thickness d of the conductive layer satisfies 0.3 μm≤d≤1.5 μm. Volume swelling of the silicon-containing material is great during charging and discharging, and because such swelling may cause the negative electrode active material layer to detach from the negative electrode current collector, the conductive layer is disposed between the negative electrode active material layer and the negative electrode current collector. The conductive layer can buffer deformation caused by the swelling of the negative electrode active material layer, thereby preventing the negative electrode active material layer from detaching from the negative electrode current collector. When d is less than 0.3 μm, an effect of buffering swelling and deformation may be poorer because the conductive layer is excessively thin; or when d is greater than 1.5 μm, volumetric energy density of the electrochemical apparatus may be reduced. Therefore, in this application, it is defined that 0.3 μm≤d≤1.5 μm.

In some embodiments of this application, a conductive material of the conductive layer may include any conductive material so long as the conductive material does not cause a chemical change. Non-limiting examples of the conductive materials include a carbon-based material (for example, natural graphite, artificial graphite, carbon black, acetylene black, Ketjen black, a carbon fiber, carbon nanotubes, or graphene), a metal-based material (for example, metal powder or a metal fiber, such as copper, nickel, aluminum, or silver), a conductive aggregate (for example, polyphenylene derivative), and a mixture thereof.

In some embodiments of this application, the silicon-containing material includes at least one of $SiO_x$, a silicon-carbon compound, or elemental silicon, where $0.5 \le x \le 1.5$. A surface of the silicon-containing material has a protective layer, and the protective layer includes a metal element; and the metal element includes at least one of Al, Si, Ti, Mn, V, Cr, Co, or Zr. The protective layer is disposed on the surface of the silicon-containing material, so that the volume swelling of the silicon-containing material during charging and discharging can be suppressed; and metal ions in the protective layer can increase the conductivity of the silicon-containing material, thereby reducing the direct current resistance.

In some embodiments of this application, a mass ratio of the metal element to the negative electrode active material layer is r1, where 0.5 ppm≤r1≤15000 ppm. In some embodiments of this application, when 0.5 ppm≤r1≤15000 ppm, the electrochemical apparatus has good cycling performance and low direct current resistance. Optionally, 180 ppm≤r1≤4520 ppm In some embodiments, a mass ratio of the silicon-containing material to the negative electrode active material layer is r2, where 0.5%≤r2≤85%. When r2 is less than 0.5%, an effect of improving a specific capacity by the silicon-containing material is not obvious. When r2 is greater than 85%, the silicon-containing material is too much, and consequently, volume swelling of the negative electrode active material layer during charging and discharging is excessively great. This may cause that the electrochemical apparatus has poor stability and increased direct current resistance.

In some embodiments of this application, the negative electrode active material layer has a porosity of 20% to 30%. When the porosity is less than 20%, less contact between the electrolyte and the negative electrode material may occur, resulting in insufficient infiltration of the electrolyte into the negative electrode material, and when the silicon-containing material swells, internal stress of the negative electrode active material layer is increased due to the excessively low porosity. However, when the porosity is greater than 30%, overall conductivity of the negative electrode active material layer may be decreased due to excessively large gaps between particles of the negative electrode material, thereby causing an increase in direct current resistance.

In some embodiments of this application, the positive electrode includes a positive electrode current collector and a positive electrode active material layer, and the positive electrode active material layer includes a positive electrode material. The positive electrode material may be, for example, lithium cobalt oxide, lithium nickel cobalt manganate, and lithium iron phosphate.

In some embodiments of this application, a conductive agent or a binder may be added to the positive electrode of the foregoing electrochemical apparatus. In some embodiments of this application, the conductive agent includes a carbon material, and the carbon material may include at least one of conductive carbon black, graphite, graphene, carbon nanotube, carbon fibers, or carbon black. The binder may include at least one of polyvinylidene fluoride, vinylidene fluoride-hexafluoropropylene copolymer, styrene-acrylate copolymer, styrene-butadiene copolymer, polyamide, polyacrylonitrile, polyacrylate, polyacrylic acid, polyacrylate, sodium carboxymethyl cellulose, polyvinyl acetate, polyvinylpyrrolidone, polyvinyl ether, polymethyl methacrylate, polytetrafluoroethylene, or polyhexafluoropropylene.

In some embodiments of this application, the electrolyte further includes at least one of 1,3-propane sultone (PS), 1,4-butane sultone, vinylene carbonate (VC), or ethylene sulfate (DTD).

In some embodiments of this application, the electrolyte includes the lithium salt. The lithium salt includes an inorganic lithium salt, such as $LiClO_4$, $LiAsF_6$, $LiPF_6$, $LiBF_4$, $LiSbF_6$, $LiSO_3F$, and $LiN(FSO_2)_2$; a fluorine-containing organic lithium salt, such as $LiCF_3SO_3$, $LiN(FSO_2)(CF_3SO_2)$, $LiN(CF_3SO_2)_2$, $LiN(C_2F_5SO_2)_2$, cyclic 1,3-hexafluoropropane disulfonylimide lithium, cyclic 1,2-tetrafluoroethane disulfonylimide lithium, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, and $LiBF_2(C_2F_5SO_2)_2$; a lithium salt containing a dicarboxylic acid complex, such as lithium bis(oxalato)borate (LiBOB) and lithium difluoro(oxalato) borate (LiDFOB). In addition, one of the foregoing lithium salts may be used alone, or two or more of the foregoing lithium salts may be used together. A concentration of the lithium salt may be in a range of 0.8 mol/L to 3 mol/L.

In some embodiments, a separator is disposed between the positive electrode and the negative electrode. The separator includes at least one of polyethylene, polypropylene, polyvinylidene fluoride, polyethylene terephthalate, polyimide, or aramid. For example, polyethylene includes at least one of high-density polyethylene, low-density polyethylene, or ultra-high-molecular-weight polyethylene. Especially, polyethylene and polypropylene have a good short-circuit prevention effect, and can improve stability of the battery through a shutdown effect. In some optional embodiments, an inorganic or organic coating is applied to a surface of the separator to enhance hardness of cells or improve adhesion of the interfaces between the separator and the positive and negative electrodes.

In some embodiments, a surface of the separator may further include a porous layer, the porous layer is provided on at least one surface of the separator, the porous layer includes inorganic particles and a binder, and the inorganic particles are at least one of aluminum oxide ($Al_2O_3$), silicon oxide ($SiO_2$), magnesium oxide (MgO), titanium oxide ($TiO_2$), hafnium oxide ($HfO_2$), tin oxide ($SnO_2$), ceria oxide ($CeO_2$), nickel oxide (NiO), zinc oxide (ZnO), calcium oxide (CaO), zirconium oxide ($ZrO_2$), yttrium oxide ($Y_2O_3$), silicon carbide (SiC), boehmite, aluminum hydroxide, magnesium hydroxide, calcium hydroxide, or barium sulfate. The binder is at least one of polyvinylidene fluoride, vinylidene fluoride-hexafluoropropylene copolymer, polyamide, polyacrylonitrile, polyacrylate, polyacrylic acid, polyacrylate, sodium carboxymethyl cellulose, polyvinylpyrrolidone, polyvinyl ether, polymethyl methacrylate, polytetrafluoroethylene, or polyhexafluoropropylene.

This application further provides an electronic apparatus, including the electrochemical apparatus according to any one of the foregoing aspects. The electronic apparatus in this application is not particularly limited, and the electronic apparatus may be any known electronic apparatus in the prior art. In some instances, the electronic apparatus may include but is not limited to a notebook computer, a pen-input computer, a mobile computer, an electronic book player, a portable telephone, a portable fax machine, a portable copier, a portable printer, a headset, a video recorder, a liquid crystal television, a portable cleaner, a portable CD player, a mini-disc, a transceiver, an electronic notebook, a calculator, a storage card, a portable recorder, a radio, a standby power source, a motor, an automobile, a motorcycle, a motor bicycle, a bicycle, a lighting appliance, a toy, a game console, a clock, an electric tool, a flash lamp, a camera, a large household battery, and the like. For example, the electronic apparatus includes a mobile phone including a lithium-ion battery.

To make the objectives, technical solutions, and advantages of this application clearer, the following clearly and completely describes the technical solutions in this application with reference to examples and comparative examples of this application. Apparently, the described embodiments are some but not all of the embodiments of this application. All other embodiments obtained by a person skilled in the art based on the technical solutions and the embodiments that are provided in this application without creative efforts shall fall within the protection scope of this application. In the following examples and comparative examples, the electrochemical apparatus is a lithium-ion battery.

(1) Preparation of a Positive Electrode Plate

A lithium cobalt oxide ($LiCoO_2$) positive electrode material, Super P, and polyvinylidene fluoride were mixed in a mass ratio of 97:1.4:1.6, N-methylpyrrolidone (NMP) was added, and the mixture was stirred by a vacuum mixer until a system became uniform, to obtain a positive electrode slurry, where a percentage of contained solid in the positive electrode slurry was 72 wt %; the positive electrode slurry was uniformly applied on a positive electrode current collector aluminum foil; and the aluminum foil was dried at 85° C., and was then subject to cold pressing, cutting, and slitting, and was dried under a vacuum condition at 85° C. for 4 hours to obtain the positive electrode plate.

(2) Preparation of a Negative Electrode Plate

An artificial graphite negative electrode material, a silicon-oxygen negative electrode active material coated with a metal oxide $SiO_x$ ($0.5 \leq x \leq 1.5$), Super P, sodium carboxymethyl cellulose (CMC), and styrene-butadiene rubber (SBR) were mixed in a mass ratio of 96.2:1.5:0.5:1.8, deionized water was added, and the mixture was stirred by a vacuum mixer, to obtain a negative electrode slurry, where a percentage of contained solid in the negative electrode slurry was 54 wt %; the negative electrode slurry was uniformly applied on a negative electrode current collector copper foil; and the copper foil was dried at 85° C., followed by cold pressing, cutting, slitting, and drying under a vacuum condition at 120° C. for 12 hours to obtain the negative electrode plate. In some examples, a conductive layer was included, and the conductive layer of a thickness of 0.3 μm to 1.5 μm was first applied on the negative electrode current collector, and the negative electrode active material layer was applied on the conductive layer after the conductive layer became dry. Mass of silicon element per unit area of the applied negative electrode material was controlled to be 0.01 mg/2 to 3 mg/$cm^2$.

(3) Preparation of an Electrolyte

In a dry argon atmosphere glove box, ethylene carbonate (EC), propylene carbonate (PC), and a linear ester were mixed in a specific mass ratio, and fluoroethylene carbonate (FEC) was added. In some examples, non-fluorinated linear ester was also added; and after full stirring, a lithium salt $LiPF_6$ was added, and the electrolyte was obtained after uniform mixing. A concentration of $LiPF_6$ was 1.1 mol/L. In each table, a percentage of each contained component in the electrolyte is a mass percentage calculated based on total mass of the electrolyte. (Percentages of contained components in the electrolyte used in examples and comparative examples are shown in Table 1 to Table 5.)

(4) Preparation of a Separator

Polyethylene (PE) of a thickness of 8 μm was selected as the separator.

(5) Preparation of a Lithium-Ion Battery

The positive electrode plate, the separator, and the negative electrode plate were laminated in order, so that the separator was placed between the positive electrode plate and the negative electrode plate for separation, and then a bare cell was obtained through winding; and after tabs were welded, the bare cell was placed in an outer packaging aluminum foil film, the prepared electrolyte was injected into the dried bare cell, and processes such as vacuum packaging, standing, formation (charged to 3.5 V at a constant current of 0.02 C and then charged to 3.9 V at a constant current of 0.1 C), shaping, and capacity testing were performed, to obtain the soft package lithium-ion battery (thickness: 3.3 mm, width: 39 mm, and length: 96 mm).

(6) Determination of Mass of Silicon Element in a Negative Electrode Material Per Unit Coating Area A negative electrode material with a specific coating area was taken, materials except for a substrate were scraped off and weighed, a specific percentage of concentrated nitric acid was added for microwave digestion to obtain a solution, and the obtained solution and a filter residue were washed several times and diluted to a specific volume; plasma intensity of silicon element therein was measured through ICP-OES, and a percentage of contained silicon in the solution was calculated based on a standard curve of the measured element, and then a percentage of contained silicon element in the material was calculated; and the percentage of silicon element was divided by an area of the negative electrode material, to obtain the mass of silicon element in the area of the negative electrode material.

(7) Determination of Metal Elements in the Protective Layer of Silicon-Containing Materials A negative electrode material with a specific coating area was taken, materials except for a substrate were scraped off and weighed, a specific percentage of concentrated nitric acid was added for microwave digestion to obtain a solution, and the obtained solution and a filter residue were washed several times and diluted to a specific volume; plasma intensity of a metal element therein was measured through ICP-OES, and a percentage of contained metal in the solution was calculated based on a standard curve of the measured element, thereby calculating a percentage of contained metal element in the material.

(8) Cycling Test

The lithium-ion battery obtained after formation was charged to 4.2 V at a constant current of 1.0 C at 35° C., then charged to 4.35 V at a constant current of 0.7 C, then charged to 4.45 V at a constant current of 0.5 C, and then charged at a constant voltage until the current reached 0.05 C. After 5 minutes of standing, the lithium-ion battery was discharged to 3.0 V at 0.5 C, and was cyclically charged and discharged for 500 times. A first discharge capacity was denoted as D0, and a discharge capacity at the 500th cycle was denoted as D1.

$$\text{Cycling capacity retention rate (\%)} = D1/D0 \times 100\%.$$

(9) Direct Current Resistance Test (DCR)

The lithium-ion battery was charged to 3.95 V at a constant current of 0.5 C, and then charged to 0.05 C at a constant voltage; and the lithium-ion battery was left to stand for 30 minutes, discharged at 0.1 C for 10 seconds (sampling was performed once every 0.1 seconds, and a corresponding voltage value U1 was recorded), and discharged at 1 C for 360 seconds (sampling was performed once every 0.1 seconds, and a corresponding voltage value U2 was recorded). Charging and discharging steps were repeatedly performed for 5 times. "1 C" was a current value at which the battery was fully discharged within 1 hour.

DCR was calculated according to the following formula: DCR=(U2−U1)/(1C−0.1C).

TABLE 1

Electrolytes and test results of Examples 1 to 13 and Comparative Examples 1 and 2

| No. | EC | PC | EC + PC | FEC | Ratio a/b of FEC/(EC + PC) | Cycling capacity retention rate | DCR (mΩ) |
|---|---|---|---|---|---|---|---|
| Example 1 | 19% | 15% | 34% | 3% | 0.09 | 54.5% | 62 |
| Example 2 | 15% | 15% | 30% | 5% | 0.17 | 57.3% | 53 |
| Example 3 | 15% | 14% | 29% | 7% | 0.24 | 64.8% | 57 |

TABLE 1-continued

| Electrolytes and test results of Examples 1 to 13 and Comparative Examples 1 and 2 | | | | | | | |
|---|---|---|---|---|---|---|---|
| No. | EC | PC | EC + PC | FEC | Ratio a/b of FEC/(EC + PC) | Cycling capacity retention rate | DCR (mΩ) |
| Example 4 | 14% | 14% | 28% | 10% | 0.36 | 76.7% | 55 |
| Example 5 | 14% | 14% | 28% | 10.5% | 0.38 | 78.9% | 55 |
| Example 6 | 11% | 14% | 25% | 12% | 0.48 | 81.3% | 54 |
| Example 7 | 7% | 17% | 24% | 14% | 0.58 | 83.5% | 56 |
| Example 8 | 6% | 13% | 19% | 15% | 0.79 | 84.2% | 49 |
| Example 9 | 4% | 13% | 17% | 17% | 1.00 | 87.3% | 48 |
| Example 10 | 4% | 13% | 17% | 18% | 1.06 | 87.8% | 56 |
| Example 11 | 6% | 12% | 18% | 20% | 1.11 | 88.1% | 56 |
| Example 12 | 4% | 12% | 16% | 22% | 1.38 | 88.4% | 57 |
| Example 13 | 0% | 11% | 11% | 25% | 2.27 | 81.5% | 54 |
| Comparative Example 1 | 15% | 26% | 41% | 1% | 0.02 | 32.1% | 85 |
| Comparative Example 2 | 7% | 7% | 14% | 40% | 2.86 | 52.3% | 93 |

As shown in Table 1, in Examples 1 to 13 and Comparative Examples 1 and 2, percentages r2 of contained $SiO_x$ were all 15%. Cycling capacity retention rates in Examples 1 to 13 were all greater than those in Comparative Examples 1 and 2, and direct current resistance in Examples 1 to 13 was all less than that in Comparative Examples 1 and 2. It can be seen that when a ratio Z of FEC/(EC+PC) was within a range of 0.05 to 2.5 shown in Examples 1 to 13, the lithium-ion battery had good cycling performance and low direct current resistance, and values of Z in Comparative Examples 1 and 2 were excessively small and great, which led to worse cycling performance and direct current resistance of the lithium-ion battery.

TABLE 2

| Electrolytes and test results of Example 7, Examples 14 to 24, and Comparative Examples 3 and 4 | | | | | | | | | | | |
|---|---|---|---|---|---|---|---|---|---|---|---|
| No. | EC | PC | EC + PC b % | FEC a % | Ratio Z of FEC/(EC + PC):a/b | Percentage r2 of contained $SiO_x$ | Mass per unit coating ($mg/cm^2$) | Mass X of distributed Si | Z/X | Cycling capacity retention rate | DCR (mΩ) |
| Example 7 | 7% | 17% | 24% | 14% | 0.58 | 15% | 6.8 | 0.6 | 0.9 | 83.5% | 56 |
| Example 14 | 19% | 15% | 34% | 3% | 0.09 | 1% | 10 | 0.1 | 1.44 | 82.2% | 62 |
| Example 15 | 15% | 15% | 30% | 5% | 0.17 | 3% | 9.7 | 0.2 | 0.93 | 82.9% | 53 |
| Example 16 | 7% | 14% | 21% | 12% | 0.57 | 10% | 7 | 0.4 | 1.33 | 83.1% | 52 |
| Example 17 | 7% | 13% | 20% | 3% | 0.65 | 12% | 7 | 0.5 | 1.26 | 82.4% | 50 |
| Example 18 | 6% | 13% | 19% | 17% | 0.89 | 20% | 7.1 | 0.9 | 1.03 | 83.6% | 62 |
| Example 19 | 6% | 13% | 19% | 18% | 0.95 | 55% | 3.7 | 1.2 | 0.76 | 79.7% | 64 |
| Example 20 | 6% | 12% | 18% | 20% | 1.11 | 80% | 2.6 | 1.3 | 0.87 | 77.9% | 66 |
| Example 21 | 4% | 12% | 16% | 22% | 1.38 | 80% | 2.6 | 1.3 | 1.08 | 80.0% | 65 |
| Example 22 | 0% | 11% | 11% | 24% | 2.18 | 80% | 2.6 | 1.3 | 1.71 | 82.1% | 63 |
| Example 23 | 0% | 11% | 11% | 25% | 2.27 | 80% | 2 | 1.0 | 2.32 | 84.1% | 51 |
| Example 24 | 0% | 11% | 11% | 27% | 2.45 | 80% | 2 | 1.0 | 2.50 | 84.3% | 48 |
| Comparative Example 3 | 19% | 15% | 34% | 2.1% | 0.06 | 80% | 1.2 | 2.5 | 0.02 | 73.8% | 84 |

TABLE 2-continued

Electrolytes and test results of Example 7, Examples 14 to 24, and Comparative Examples 3 and 4

| No. | EC | PC | EC + PC b % | FEC a % | Ratio Z of FEC/(EC + PC):a/b | Percentage r2 of contained $SiO_x$ | Mass per unit coating ($mg/cm^2$) | Mass X of distributed Si | Z/X | Cycling capacity retention rate | DCR (mΩ) |
|---|---|---|---|---|---|---|---|---|---|---|---|
| Comparative Example 4 | 0% | 11% | 11% | 27% | 2.45 | 80% | 1.1 | 0.5 | 5.38 | 72.3% | 82 |

Note:
The mass of distributed Si in Table 2 is mass of silicon element per unit coating area on a negative electrode current collector.

From data in Example 7 and Examples 14 to 24, and Comparative Examples 3 and 4, it can be seen that compared with those in Comparative Examples 3 and 4, in Example 7 and Examples 14 to 24, cycling capacity retention rates were greater and direct current resistance was smaller. It can be seen that when a ratio of a mass ratio Z of fluoroethylene carbonate to non-fluorinated cyclic carbonate to mass X of silicon element per unit coating area on the negative electrode plate ranged from 0.9 to 2.5, the lithium-ion battery had good cycling performance and low direct current resistance. When a value of Z/X was excessively great (Comparative Example 4) or excessively small (Comparative Example 3), this was not conducive to the cycling performance and direct current resistance of the lithium-ion battery.

TABLE 3

Electrolytes and test results of Example 7 and Examples 25 to 32, and Comparative Example 1

| No. | EC | PC | Non-fluorinated linear ester | Percentage c % of contained non-fluorinated linear ester | EC + PC b % | FEC a % | Non-fluorinated cyclic ester/Non-fluorinated linear ester | Ratio Z of FEC/(EC + PC):a/b | Cycling capacity retention rate | DCR (mΩ) |
|---|---|---|---|---|---|---|---|---|---|---|
| Example 7 | 7% | 17% | DEC | 43% | 24% | 14% | 0.56 | 0.58 | 83.5% | 56 |
| Example 25 | 19% | 15% | DEC | 42% | 34% | 3% | 0.81 | 0.09 | 82.6% | 61 |
| Example 26 | 15% | 15% | DEC | 45% | 30% | 5% | 0.67 | 0.17 | 82.8% | 52 |
| Example 27 | 7% | 14% | PP + EP | 48% | 21% | 13% | 0.44 | 0.57 | 81.7% | 50 |
| Example 28 | 6% | 13% | DEC + PP | 45% | 19% | 17% | 0.42 | 0.89 | 83.1% | 53 |
| Example 29 | 6% | 13% | DEC + PP + EP | 44% | 19% | 18% | 0.43 | 0.95 | 80.9% | 49 |
| Example 30 | 0 | 13% | DEC + PP + EP | 52% | 13% | 20% | 0.25 | 1.5 | 78.4% | 52 |
| Example 31 | 7% | 13% | EMC | 49% | 20% | 13% | 0.41 | 0.65 | 53.2% | 42 |
| Example 32 | 7% | 13% | DMC | 49% | 20% | 13% | 0.41 | 0.65 | 48.7% | 38 |
| Comparative Example 1 | 15% | 26% | DEC | 34% | 41% | 1% | 1.21 | 0.02 | 32.1% | 85 |

From comparison of Example 7 and Examples 25 to 32 and Comparative Example 1 in Table 3, it can be seen that (in Table 3, percentages r2 of contained $SiO_x$ were all 15%), compared with those in Comparative Example 1, in Example 7 and Examples 25 to 32, cycling capacity retention rates were greater and direct current resistance was smaller. It can be seen that when a ratio b/c of a percentage b of contained non-fluorinated cyclic ester to a percentage c of contained linear ester ranged from 0.1 to 1, this was conducive to improvement of the cycling performance and reduction of the direct current resistance of the lithium-ion battery. However, when b/c was greater than 1 (Comparative Example 1), it was possible that the cycling performance was decreased and the direct current resistance was increased.

TABLE 4

Electrolytes and test results of Example 7 and Examples 33 to 38, and Comparative Example 5

| No. | Metal element in protective layer | Percentage of contained metal element in protective layer (ppm) | Cycling capacity retention rate | DCR (mΩ) |
|---|---|---|---|---|
| Example 7 | Al | 180 | 83.5% | 56 |
| Example 33 | Al | 720 | 84.6% | 54 |
| Example 34 | Al | 1443 | 85.7% | 53 |
| Example 35 | Al | 2942 | 86.2% | 51 |
| Example 36 | Al | 4520 | 86.4% | 52 |
| Example 37 | Ti | 180 | 83.8% | 55 |
| Example 38 | AI + Ti | 180 | 84.9% | 52 |
| Comparative Example 5 | / | / | 72.4% | 70 |

Mass percentages of FEC, EC, and PC in Examples 33 to 38 and Comparative Example 5 were equal to mass percentages of FEC, EC, and PC in Example 7 in Table 1.

As shown in Table 4 (in Table 4, percentages r2 of contained $SiO_x$ were all 15%), compared with those in Comparative Example 5, in Example 7 and Examples 32 to 37, cycling capacity retention rates were greater and direct current resistance was smaller. This is because a protective layer was disposed on a surface of a silicon-containing material in Example 7 and Examples 32 to 37, and the protective layer included a specific percentage of metal element, which can suppress volume swelling and increase conductivity of the silicon-containing material in cycling. Therefore, in some embodiments of this application, the surface of the silicon-containing material was provided with the protective layer, the protective layer had the metal element, and a mass ratio of the metal element to a negative electrode active material layer was r1, where 0.5 ppm≤r1≤15000 ppm.

TABLE 5

Electrolytes and test results of Examples 39 to 41 and Comparative Examples 6 and 7

| No. | Non-fluorinated cyclic carbonate/ Non-fluorinated linear ester | Ratio Z of FEC/(EC + PC): a/b | Porosity of negative electrode active material layer | Cycling capacity retention rate | DCR (mΩ) |
|---|---|---|---|---|---|
| Example 39 | 0.56 | 0.58 | 20% | 83.5% | 55 |
| Example 40 | 0.56 | 0.58 | 25% | 85.3% | 53 |
| Example 41 | 0.56 | 0.58 | 30% | 83.2% | 56 |
| Comparative Example 6 | 0.56 | 0.58 | 50% | 75.4% | 74 |
| Comparative Example 7 | 0.56 | 0.58 | 5% | 66.8% | 78 |

As shown in Table 5 (in Table 5, percentages r2 of contained $SiO_x$ were all 15%), in Examples 39 to 41 and Comparative Examples 6 and 7, mass percentages of EC, PC, non-fluorinated linear ester, and FEC in electrolytes were equal. EC accounted for 7% of the electrolyte by mass, PC accounted for 17% of the electrolyte by mass, non-fluorinated linear ester accounted for 43% of the electrolyte by mass, and FEC accounted for 14% of the electrolyte by mass. Compared with those in Comparative Examples 6 and 7, in Examples 39 to 41, cycling capacity retention rates were greater and direct current resistance was smaller. This is because porosity of a negative electrode active material layer in Comparative Example 6 was excessively great, which affected electrical conduction between particles in the negative electrode active material layer; and conductivity of the silicon-containing material was relatively low, and therefore, performance of the lithium-ion battery was further affected. Porosity of a negative electrode active material layer in Comparative Example 7 was excessively small, thereby causing insufficient infiltration of the electrolyte into a negative electrode material and affecting the performance of the lithium-ion battery. Therefore, in some embodiments, porosity of the negative electrode active material layer is limited to 20% to 30%.

The foregoing descriptions are only preferred embodiments of this application and an explanation of applied technical principles. Persons skilled in the art should understand that the scope of the disclosure related to this application is not limited to technical solutions formed by specifically combining the foregoing technical characteristics, and shall also cover other technical solutions formed by randomly combining the foregoing technical characteristics or their equivalent characteristics without departing from the foregoing disclosed idea, for example, a technical solution formed by replacing the foregoing characteristics with technical characteristics with similar functions to those (which are not limited thereto) disclosed in this application.

What is claimed is:

1. An electrochemical apparatus, comprising:

a positive electrode;

a negative electrode; and an electrolyte, wherein the electrolyte comprises fluoroethylene carbonate and a non-fluorinated cyclic carbonate, the fluoroethylene carbonate accounts for a % of the electrolyte by mass, and the non-fluorinated cyclic carbonate accounts for b % of the electrolyte by mass, wherein 0.05≤a/b≤2.5; wherein the negative electrode comprises a negative electrode current collector and a negative electrode active material layer disposed on the negative electrode current collector; wherein the negative electrode active material layer comprises a negative electrode material, the negative electrode material comprises a silicon-containing material;

a mass of silicon element per unit coating area on the negative electrode current collector is X mg/cm$^2$, wherein 0.1≤X≤1.3; wherein the silicon-containing material comprises at least one selected from the group consisting of $SiO_x$, a silicon-carbon compound, and elemental silicon, wherein 0.5≤x≤1.5;

a surface of the silicon-containing material has a protective layer comprising a metal element; and the metal element comprises at least one selected from the group consisting of Al, Ti, Mn, V, Cr, Co, and Zr.

2. The electrochemical apparatus according to claim 1, wherein 3≤a≤25.

3. The electrochemical apparatus according to claim 1, wherein 11≤b≤34.

4. The electrochemical apparatus according to claim 1, wherein 0.09≤a/b≤2.27.

5. The electrochemical apparatus according to claim 1, wherein the electrolyte further comprises a non-fluorinated linear ester, and the non-fluorinated linear ester accounts for c % of the electrolyte by mass, wherein 0.1≤b/c≤1.

6. The electrochemical apparatus according to claim 5, wherein 0.25≤b/c≤0.81.

7. The electrochemical apparatus according to claim 1, wherein the non-fluorinated cyclic carbonate comprises at least one selected from the group consisting of ethylene carbonate and propylene carbonate.

8. The electrochemical apparatus according to claim 1, wherein the negative electrode further comprises a conductive layer disposed between the negative electrode current collector and the negative electrode active material layer; and a thickness d of the conductive layer satisfies 0.3 μm≤d≤1.5 μm.

9. The electrochemical apparatus according to claim 1, wherein 0.2≤X≤1.3.

10. The electrochemical apparatus according to claim 1, wherein a/b=Z and 0.76≤Z/X≤2.5.

11. The electrochemical apparatus according to claim 1, wherein a mass ratio of the silicon-containing material to the negative electrode active material layer is r2, wherein 0.5%≤r2≤85%.

12. The electrochemical apparatus according to claim 1, wherein the negative electrode active material layer has a porosity in a range of 20% to 30%.

13. The electrochemical apparatus according to claim 1, wherein a mass ratio of the metal element to the negative electrode active material layer is r1, wherein 0.5 ppm≤r1≤15000 ppm.

14. The electrochemical apparatus according to claim 13, wherein 180 ppm≤r1≤4520 ppm.

15. An electronic apparatus, comprising an electrochemical apparatus, wherein the electrochemical apparatus comprises:

a positive electrode;

a negative electrode; and an electrolyte, wherein the electrolyte comprises fluoroethylene carbonate and a non-fluorinated cyclic carbonate, the fluoroethylene carbonate accounts for a % of the electrolyte by mass, and the non-fluorinated cyclic carbonate accounts for b % of the electrolyte by mass, wherein 0.05≤a/b≤2.5; wherein the negative electrode comprises a negative electrode current collector and a negative electrode active material layer disposed on the negative electrode current collector; wherein the negative electrode active material layer comprises a negative electrode material, the negative electrode material comprises a silicon-containing material;

a mass of silicon element per unit coating area on the negative electrode current collector is X mg/cm$^2$, wherein 0.1≤X≤1.3; wherein the silicon-containing material comprises at least one selected from the group consisting of $SiO_x$, a silicon-carbon compound, and elemental silicon, wherein 0.5≤x≤1.5;

a surface of the silicon-containing material has a protective layer comprising a metal element; and the metal element comprises at least one selected from the group consisting of Al, Ti, Mn, V, Cr, Co, and Zr.

16. The electronic apparatus according to claim 15, wherein 3≤a≤25.

17. The electronic apparatus according to claim 15, wherein 11≤b≤34.

18. The electronic apparatus according to claim 15, wherein 0.09≤a/b≤2.27.

* * * * *